(12) United States Patent
Kraus et al.

(10) Patent No.: US 11,789,746 B2
(45) Date of Patent: *Oct. 17, 2023

(54) COMPUTING DEVICE REBOOT

(71) Applicant: Micron Technology, Inc., Boise, ID (US)

(72) Inventors: Brenda D. Kraus, Boise, ID (US); Yifen Liu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,326

(22) Filed: Sep. 28, 2022

(65) Prior Publication Data

US 2023/0012867 A1    Jan. 19, 2023

Related U.S. Application Data

(63) Continuation of application No. 17/094,976, filed on Nov. 11, 2020, now Pat. No. 11,467,850.

(51) Int. Cl.
*G06F 9/44* (2018.01)
*G06F 9/4401* (2018.01)
*G06N 20/00* (2019.01)
*G06F 9/445* (2018.01)

(52) U.S. Cl.
CPC .......... *G06F 9/4418* (2013.01); *G06F 9/4406* (2013.01); *G06F 9/44505* (2013.01); *G06N 20/00* (2019.01)

(58) Field of Classification Search
CPC ................ G06F 1/32; G06F 9/44; G06F 1/12
See application file for complete search history.

(56) References Cited

U.S. PATENT DOCUMENTS

| | | |
|---|---|---|
| 9,075,629 B2 | 7/2015 | Bak et al. |
| 9,361,243 B2* | 6/2016 | Shaath .................. G06F 16/176 |
| 9,740,562 B2 | 8/2017 | Leibman et al. |
| 10,575,269 B2 | 2/2020 | Chae et al. |
| 2008/0256295 A1 | 10/2008 | Lambert et al. |

(Continued)

OTHER PUBLICATIONS

International Search Report and Written Opinion from international application No. PCT/US2021/054097, dated Jan. 20, 2022, 9 pages.

*Primary Examiner* — Keshab R Pandey
(74) *Attorney, Agent, or Firm* — Brooks, Cameron & Huebsch, PLLC

(57) ABSTRACT

Methods and apparatuses associated with rebooting a computing device are described. Examples can include receiving at a processing resource of a computing device first signaling associated with boot programs of the computing device and second signaling associated with a boot sequence of the computing device. Examples can include writing from the processing resource to a memory resource data that is based at least in part on the first and the second signaling and writing from the processing resource to the memory resource data representative of activity of the computing device. Examples can include identifying data representative of a boot process for the computing device and rebooting the computing device in a particular sequence including the monitored activity, based at least in part on the data representative of the boot process responsive to a shutdown, restart, or both, of the computing device.

18 Claims, 4 Drawing Sheets

(56) References Cited

U.S. PATENT DOCUMENTS

| | | |
|---|---|---|
| 2009/0307475 A1 | 12/2009 | Fried |
| 2010/0082962 A1* | 4/2010 | Srinivasan ............ G06F 9/4401 |
| | | 711/E12.083 |
| 2012/0144178 A1 | 6/2012 | Iyigun et al. |
| 2015/0143099 A1 | 5/2015 | Preston et al. |
| 2015/0178097 A1 | 6/2015 | Russinovich |
| 2016/0321146 A1 | 11/2016 | Makino et al. |
| 2017/0168872 A1* | 6/2017 | Kim ...................... G06F 9/4887 |
| 2017/0351527 A1 | 12/2017 | Holland et al. |
| 2019/0250963 A1* | 8/2019 | Peterson ................. G06F 9/542 |
| 2020/0226025 A1 | 7/2020 | Bravo et al. |
| 2020/0293694 A1 | 9/2020 | Gonzalez Mendez |
| 2021/0182075 A1* | 6/2021 | Jain ........................ G06N 20/00 |

\* cited by examiner

COMPUTING DEVICE REBOOT

PRIORITY INFORMATION

This application is a Continuation of U.S. application Ser. No. 17/094,976, filed Nov. 11, 2020, the contents of which are incorporated herein by reference.

TECHNICAL FIELD

The present disclosure relates generally to apparatuses and methods associated with rebooting a computing device.

BACKGROUND

A computing device is a mechanical or electrical device that transmits or modifies energy to perform or assist in the performance of human tasks. Examples include thin clients, personal computers, printing devices, laptops, mobile devices, internet-of-things (IoT) enabled devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A mobile device, as used herein, can include a portable computing device such as a smartphone, tablet, e-reader, smartwatch or other wearable device, laptop, camera, etc. A mobile device may include a camera or cameras, sensors, and security capability features such as biometric scanners (e.g., eye scanner, facial recognition, fingerprint scanner) and passcode requirements, among others.

DETAILED DESCRIPTION

Figure 1:
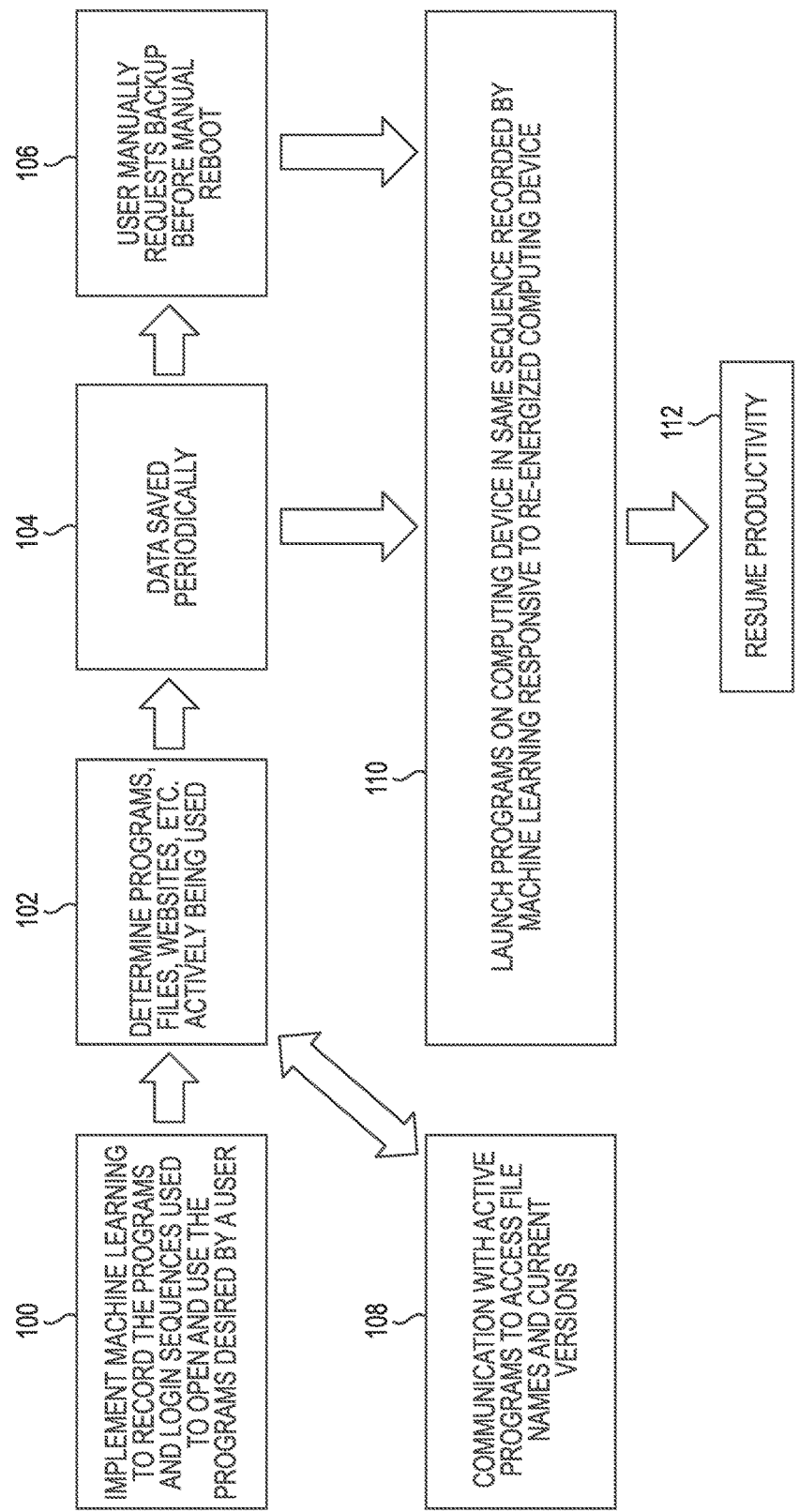
FIG. 1 is a flow diagram representing an example method for rebooting a computing device in accordance with a number of embodiments of the present disclosure.

Examples of the present disclosure include apparatuses and methods for rebooting a computing device. A number of examples of the present disclosure can include receiving at a processing resource of a computing device first signaling associated with boot programs of the computing device and receiving at the processing resource of the computing device second signaling associated with a boot sequence of the computing device. Examples can include writing from the processing resource to a memory resource coupled to the processing resource data that is based at least in part on the first and the second signaling and writing from the processing resource to the memory resource data representative of activity of the computing device including programs, applications, files, websites, or a combination thereof.

Examples can further include identifying at the processing resource or at a different processing resource, data representative of a boot process for the computing device based at least in part on input representative of the written data based at least in part on the first and the second signaling and the written data representative of the activity of the computing device and, responsive to a shutdown, restart, or both, of the computing device, rebooting the computing device in a particular sequence including the monitored activity, based at least in part on the data representative of the boot process Other examples of the present disclosure can include a non-transitory machine-readable medium comprising a processing resource in communication with a memory resource having instructions executable to record at the processing resource, the memory resource, or both, a plurality of input data comprising at least two of a boot process of a computing device, a currently-running process on the computing device, a current application running on the computing device, a current program running on the computing device, a current website open on the computing device, a currently-open file on the computing device, or a combination thereof and write from the processing resource to the memory resource the recorded input data. The examples can include instructions executable to identify at the processing resource or a different processing resource output data representative of a sequence of the boot process based at least in part on input data representative of the boot process and additional data stored in the memory resource and representative of previous boot processes of the computing device.

Responsive to a shutdown, restart, or both, of the computing device, the instructions can be executable to reboot the computing device in the identified boot process sequence and execute the currently-running process on the computing device, the current application running on the computing device, the current program running on the computing device, the current web site open on the computing device, the currently-open file on the computing device, or a combination thereof.

Yet other examples of the present disclosure can include a non-transitory machine-readable medium comprising a first processing resource in communication with a memory resource having instructions executable to record at the processing resource, the memory resource, or both, a plurality of input data comprising at least two of a boot process of a computing device, a currently-running process on the computing device, a current application running on the computing device, a current program running on the computing device, a current website open on the computing device, a currently-open file on the computing device, or a combination thereof and write from the processing resource to the memory resource the recorded input data. Examples can include instructions executable to create a duplicate of the currently-running process on the computing device, the current application running on the computing device, the current program running on the computing device, the current website open on the computing device, the currently-open file on the computing device, or a combination thereof and write from the processing resource to the memory resource input data representative of the duplicate.

In a number of examples, the instructions can be executable to identify at the processing resource or a different processing resource output data representative of a sequence of the boot process based at least in part on input data representative of the boot process and additional data stored in the memory resource and representative of previous boot processes of the computing device and using a machine learning model. Responsive to a shutdown, restart, or both, of the computing device, the instructions can be executable to reboot the computing device in the identified boot process sequence and execute the duplicate.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures can be identified by the use of similar digits. For instance, element "24" in FIG. 2 may be referenced as "224" in FIGS. 2 and "324" in FIG. 3. It is also to be understood that the terminology used herein is for the purpose of describing particular embodiments only and is not intended to be limiting. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Computing devices may be rebooted (e.g., restarted, re-energized, shutdown and restarted, etc.) to fix errors, update and/or add security settings, install and/or remove new updates and programs, or a combination thereof. This can include closing programs, files, applications, documents, spreadsheets, etc. in use prior to the reboot. In some instances, power to the computing device can be terminated (e.g., power outage, battery lose charge, etc.), which can result in a shutdown and/or reboot. When power is restored or the computing device is rebooted, time may be spent reopening programs, documents, emails, applications, etc., as well as logging into applications, systems, etc. to resume previous work. This time spent rebooting and logging in can reduce productivity and may result in lost work.

Examples of the present disclosure can allow for recording of a sequence of user actions required to access programs, applications, etc., monitoring of active programs, files, websites, etc., and storing of the data in a memory resource (e.g., a non-volatile memory resource) associated with a computing device. The memory resource may be located on the computing device or communicatively coupled to the computing device. As used herein, "communicatively coupled" can include coupled via various wired and/or wireless connections between devices such that data can be transferred in various directions between the devices. The coupling need not be a direct connection, and in some examples, can be an indirect connection.

The data can be near-continuously overwritten with updated versions of currently-active files, programs, etc. As used herein, "near-continuously" includes overwriting (e.g., sending, receiving, writing, etc.) without meaningful breaks. The memory resource can be accessed following a reboot (e.g., once power is restored to the computing device), the stored data can be opened, and the sequence of programs and the requests for logins required to access programs, applications, etc. that were in use before the reboot can be initiated. In some examples, a duplicate of the programs, applications, etc. running prior to the reboot can be created, allowing the user to resume, upon reboot, work in the programs, files, websites, etc. that were previously open. The memory resource access, opening of stored data, initiating sequence and login request, and/or creation of the duplication can be done automatically, in some examples. In some instances, the memory resource can be accessed after power is restored to the computing device and/or a file, program, etc. As used herein, "automatically" can include an action performed with limited or no user input and/or with limited or no prompting. For instance, actions may be taken with limited or no user input responsive to particular prompting, input, loss of power, etc.

FIG. 1 is a flow diagram representing an example method for rebooting a computing device in accordance with a number of embodiments of the present disclosure. The method can be performed by an apparatus such as the apparatuses 220 and 340 described with respect to FIGS. 2 and 3, respectively.

At 100, machine learning (e.g., a machine learning model) can be implemented to record programs and login sequences used to open and use programs desired by a user. For instance, a user of a computing device may login into his or her computing device, open email, open a document management service, open a word processing program, and open a web browser. These actions may be taken daily, for instance, and may be taken in a particular order. Such actions and orders can be recorded. Other actions, sequences, programs, etc. may be opened and recorded, and examples are not so limited.

A machine learning model can be trained and updated with new data as it is received. For instance, each time the user boots his or her computing device, programs, login sequences, and other activity can be recorded, and the machine learning model can be updated. The machine learning model can be turned off or paused, for instance, if the user is using the computing device in an abnormal manner (e.g., allowing a co-worker to use their device), among other reasons.

At 102, programs, files, websites, and/or other applications being actively used are determined. For instance, a task manager may be consulted to determine currently-active files, programs, websites, applications, etc. In some instances, pattern recognition of task bar icons may be used to determine the same. At 108, these currently-active files, programs, websites, applications, etc. can be communicated (e.g., to a processing resource, a memory resource, or both), along with what version is being run and names of the currently-active files, programs, websites, applications, etc. For instance, if a user is currently running Version 2 of Word Processing Program A, with a file name "Letter", this data can be communicated and saved for use in a reboot.

At 104, data associated with the currently-active files, programs, websites, applications, etc. can be saved periodically (e.g., at particular intervals). A time interval for saving to a memory resource or other storage can be a default setting or determined by a user. For instance, the currently-active files, programs, websites, applications, etc. can be saved (e.g., written to a memory resource) every five minutes. When saved, a most current version/copy can be saved and can overwrite a previous version to save storage space, for example. Such periodic saving can allow for most-recent versions being available after a power loss (e.g., expected or unexpected).

In some examples, as illustrated at 106, a user can manually request a backup before a manual reboot. For instance, a user may receive an indication that his or her system, device, etc. will be restarted and/or needs to be restarted (e.g., for updates). The user can manually request (e.g., via a system menu or other option) to save the most updated copies of currently-active files, programs, websites, applications, etc. including what version was being run for each of the files, programs, websites, applications, etc.

At 110, in response to re-energizing the computing device (e.g., reboot, restart, wake up, etc.), the currently-active files, programs, websites, applications, etc. can be launched on the computing device in a same sequence recorded by the machine learning model. For instance, the user may be prompted to login into his or her computing device, email may be opened (and login prompted where necessary), a document management service may be opened, a word processing program may be opened, and a web browser may be opened in an order determined to be typical by the machine learning model. Files, programs, websites, applications, etc. that were currently-active before the re-energization may be launched, as well, and opened to a same location of the last save (e.g., mirroring the system's previous state). At 112, productivity may be resumed, such that the user is able to pick up where he or she left off before the shutdown/reboot.

Figure 2:
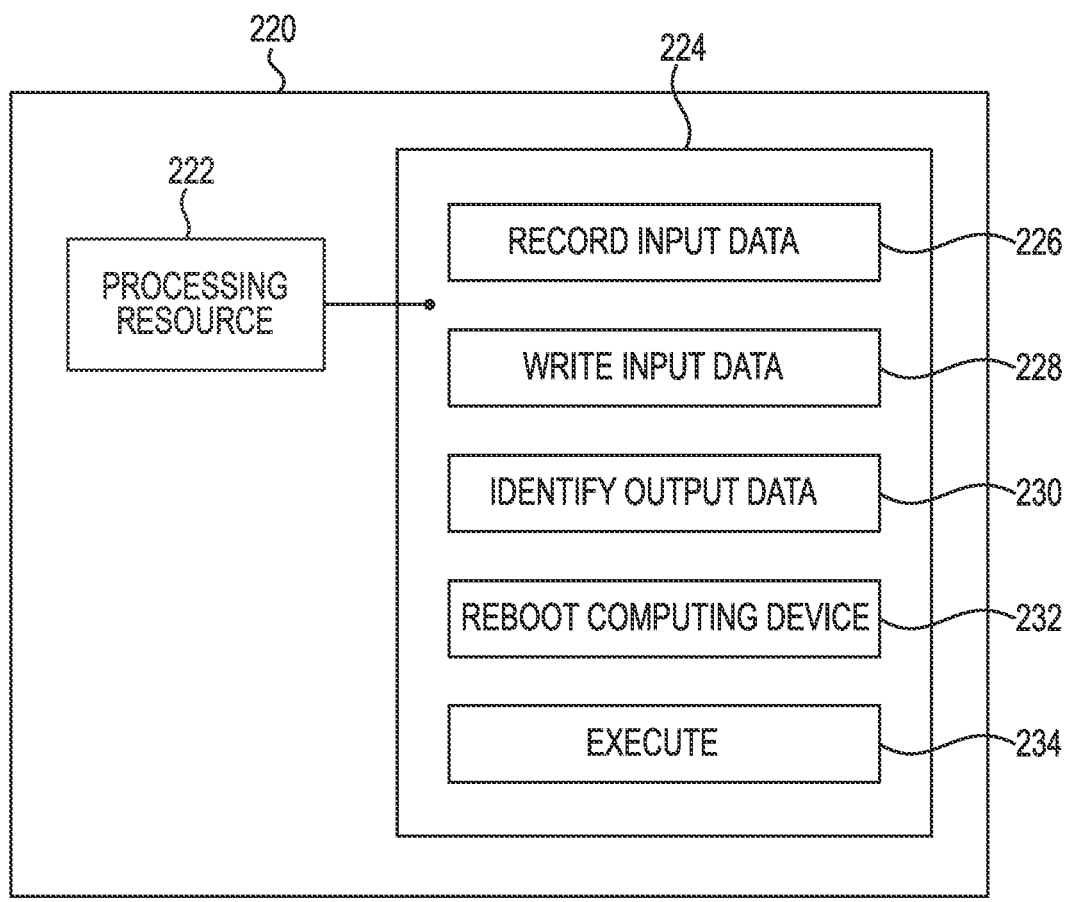
FIG. 2 is a diagram of an example apparatus having a processor and a memory resource with executable instructions thereon in accordance with a number of embodiments of the present disclosure.

FIG. 2 is a diagram of an example apparatus 220 having a processing resource 222 and a memory resource 224 with executable instructions 226, 228, 230, 232, and 234 thereon in accordance with a number of embodiments of the present disclosure. The apparatus 220 illustrated in FIG. 2 can be a computing device and can include the processing resource 222. Although the following descriptions refer to a processing resource and a memory resource, the descriptions may also apply to a system with multiple processing resources and multiple memory resources. In such examples, the instructions 226, 228, 230, 232, and 234 may be distributed (e.g., stored) across multiple memory resources and the instructions 226, 228, 230, 232, and 234 may be distributed (e.g., executed by) across multiple processing resources.

The memory resource 224 may be electronic, magnetic, optical, or other physical storage device that stores executable instructions. Thus, the memory resource 224 may be, for example, non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory, resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random-access memory (SRAM), among others. In some examples, data may be written to storage or a memory resource other than memory resource 224; for example, if memory resource 224 is volatile memory, data may be written to a non-volatile memory resource such that data is not lost when power to the computing device is lost.

In some examples, the memory resource 224 is a non-transitory machine-readable medium (MRM) comprising Random Access Memory (RAM), an Electrically-Erasable Programmable ROM (EEPROM), a storage drive, an optical disc, and the like. The memory resource 224 may be disposed within a controller and/or computing device. In this example, the executable instructions 226, 228, 230, 232, and 234 can be "installed" on the device. Additionally and/or alternatively, the memory resource 224 can be a portable, external or remote storage medium, for example, that allows the system to download the instructions 226, 228, 230, 232, and 234 from the portable/external/remote storage medium. In this situation, the executable instructions may be part of an "installation package". As described herein, the memory resource 224 can be encoded with executable instructions for rebooting a computing device.

The instructions 226, when executed by a processing resource such as the processing resource 222, can record at the processing resource 222, the memory resource 224, or both, a plurality of input data comprising at least two of a boot process of a computing device, a currently-running process on the computing device, a current application running on the computing device, a current program running on the computing device, a current website open on the computing device, a currently-open file on the computing device, or a combination thereof. The instructions 228, when executed by a processing resource such as the processing resource 222, can write from the processing resource to the memory resource 224 the recorded input data.

For instance, a user may currently have a word processing program open, a website open, and a photograph open on his or her computing device. These can be recorded at the processing resource 222, the memory resource 224, or both. This recording can be done near-continuously, periodically, or manually. The data can be written to the memory resource 224 for use following a loss of power, shutdown, or reboot, among others. In such an example, the memory resource 224, can be a non-volatile memory resource, such that the recorded (e.g., saved) data is not lost during reboot (e.g., persistent data provided by retaining written data when not powered).

The instructions 230, when executed by a processing resource such as the processing resource 222, can identify at the processing resource or a different processing resource output data representative of a sequence of the boot process based at least in part on input data representative of the boot process and additional data stored in the memory resource 224 and representative of previous boot processes of the computing device. For instance, the boot process may include a process the computing device undergoes during startup of the computing device. This can include programs and applications needed for the computing device to function and can also be affected by user preferences. For instance, a boot process may include executing startup programs of the computing device, as well as prompts to a user to launch particular programs, launching of the programs, launching of an Internet browser, and launching of business programs (e.g., file-sharing programs, etc.), among others. The boot process can occur in a particular order, for instance.

In some examples, the identification can include using a machine learning model trained with data representative of the previous boot processes. For instance, a user may boot the same computing device every workday. Each time the computing device is booted, the boot process (e.g., including applications launched, credential verifications, connections to other devices, etc.) can be recorded, and a machine learning model can use associated boot process data to learn a typical boot process of the user. The boot process may change with time, and the machine learning model can adjust accordingly.

Responsive to a shutdown, restart, or both, the instructions 232, when executed by a processing resource such as the processing resource 222, can reboot the computing device in the identified boot process sequence and the instructions 234, when executed by a processing resource such as the processing resource 222, can execute the currently-running process on the computing device, the current application running on the computing device, the current program running on the computing device, the current website open on the computing device, the currently-open file on the computing device, or a combination thereof. For instance, a user may experience the computing device reboot in a manner he or she is accustomed to, and the computing device may be restored to the pre-reboot state (e.g., mirroring the pre-shutdown, restart, etc. state).

In some examples, a user of the computing device can be prompted (e.g., via a user interface, display, audio alert, etc.) for login and password information where required by the current application running on the computing device, the current program running on the computing device, the current website open on the computing device, the currently-open file on the computing device, or combination thereof or where required by the boot process. For instance, just as user would be prompted for login information during a typical start-up of a computing device, the user may be prompted during a reboot in order to get the user to the pre-shutdown/restart state.

In some examples, a duplicate of the currently-running process on the computing device, the current application running on the computing device, the current program running on the computing device, the current website open on the computing device, the currently-open file on the computing device, or a combination thereof can be created, and the duplicate can be executed. For instance, the boot process and associated data may be written to the memory resource 224, and a duplicate may be created. In such examples, the duplicate may be executed during reboot.

Figure 3:
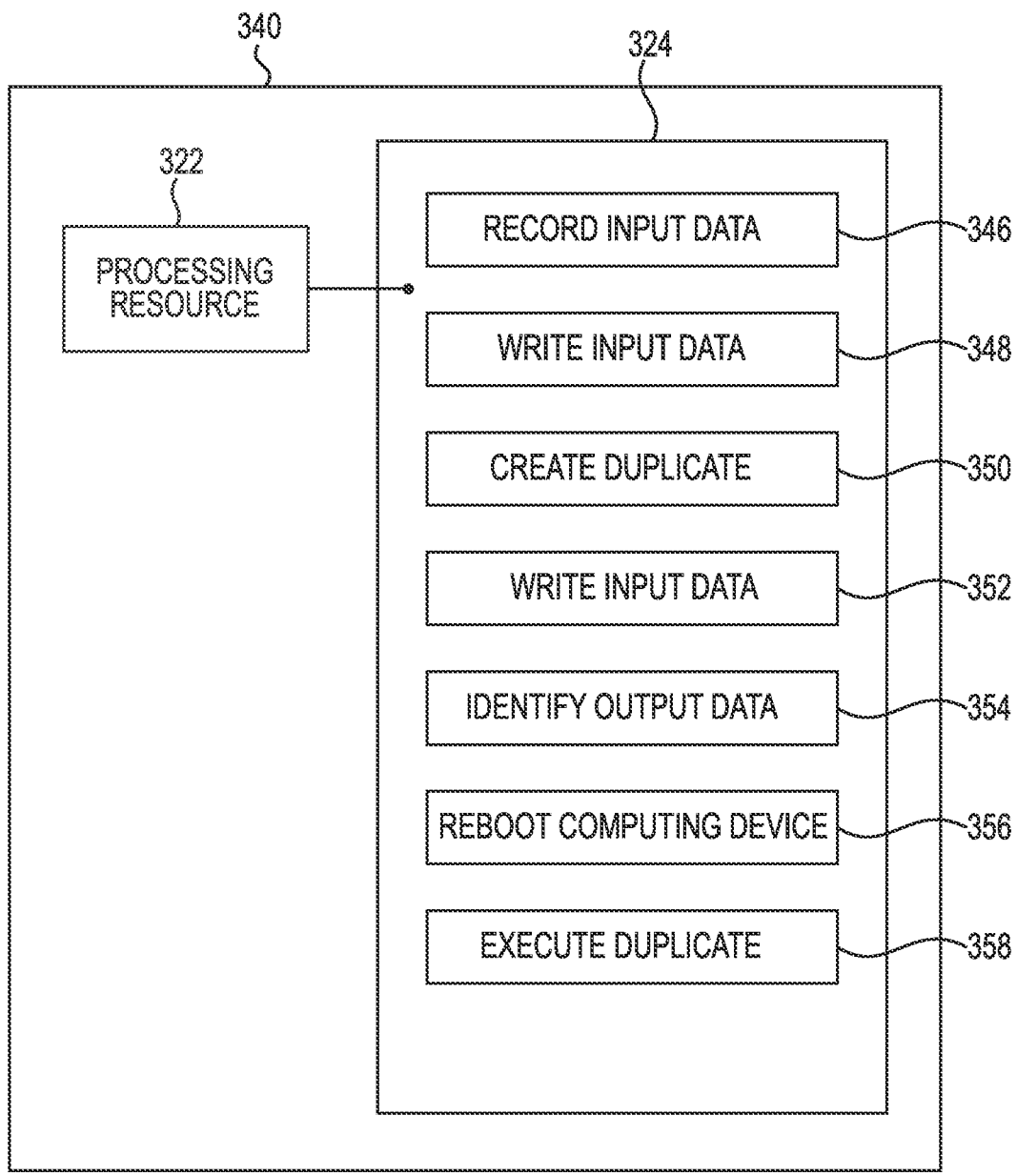
FIG. 3 is another diagram of an example apparatus having a processor and a memory resource with executable instructions thereon in accordance with a number of embodiments of the present disclosure.

FIG. 3 is another diagram of an example apparatus 340 having a processor 322 and a memory resource 324 with executable instructions 346, 348, 350, 352, 354, 356, and 358 thereon in accordance with a number of embodiments of the present disclosure. The apparatus illustrated in FIG. 3 can be a computing device and may be analogous to the apparatus (e.g., computing device) 220 described with respect to FIG. 2. Similar, the processing resource 322 and the memory resource 324 may be analogous to the processing resource 222 and the memory resource 224, respectively, as described with respect to FIG. 2.

The instructions 346, when executed by a processing resource such as the processing resource 322, can record at the processing resource, the memory resource 324, or both, a plurality of input data comprising at least two of a boot process of a computing device, a currently-running process on the computing device, a current application running on the computing device, a current program running on the computing device, a current website open on the computing device, a currently-open file on the computing device, or a combination thereof. For instance, this can include recording applications, programs, websites, files, or a combination thereof identified as currently-running on a task manager of the computing device. In some examples, the recording can commence responsive to receiving at the processing resource, the memory resource 324, or both, input data representative of a request to record before a manual reboot of the computing device.

The instructions 348, when executed by a processing resource such as the processing resource 322, can write from the processing resource 322 to the memory resource 324 the recorded input data, and the instructions 350, when executed by a processing resource such as the processing resource 322, can create a duplicate of the currently-running process on the computing device, the current application running on the computing device, the current program running on the computing device, the current website open on the computing device, the currently-open file on the computing device, or a combination thereof. For instance, latest versions of the currently-running process on the computing device, the current application running on the computing device, the current program running on the computing device, the current website open on the computing device, the currently-open file on the computing device, or combination thereof can be determined, and the duplicate can be created using the latest versions. The instructions 352, when executed by a processing resource such as the processing resource 322, can write from the processing resource to the memory resource 324 input data representative of the duplicate.

The instructions 354, when executed by a processing resource such as the processing resource 322, can identify at the processing resource or a different processing resource output data representative of a sequence of the boot process based at least in part on input data representative of the boot process and additional data stored in the memory resource 324 and representative of previous boot processes of the computing device and using a machine learning model. For instance, the sequence of the boot process may include what processes (e.g., programs, applications, etc.) are typically launched during startup of the computing device and in what order.

Responsive to a shutdown, restart, or both, of the computing device, the instructions 356, when executed by a processing resource such as the processing resource 322, can reboot the computing device in the identified boot process sequence, and the instructions 358, when executed by a processing resource such as the processing resource 322, can execute the duplicate. For instance, the computing device can startup for the user in a manner familiar to the user, and can execute the duplicate, which can include launching applications, programs, etc. that were in use by a user prior to a shutdown, restart, etc., as well as what version was in use and the most-recently recorded actions (e.g., word processing documents, websites, etc.). For instance, a user may be presented with a display that mirrors the pre-shutdown or restart state, such that he or she may resume actions where he or she left off.

Figure 4:
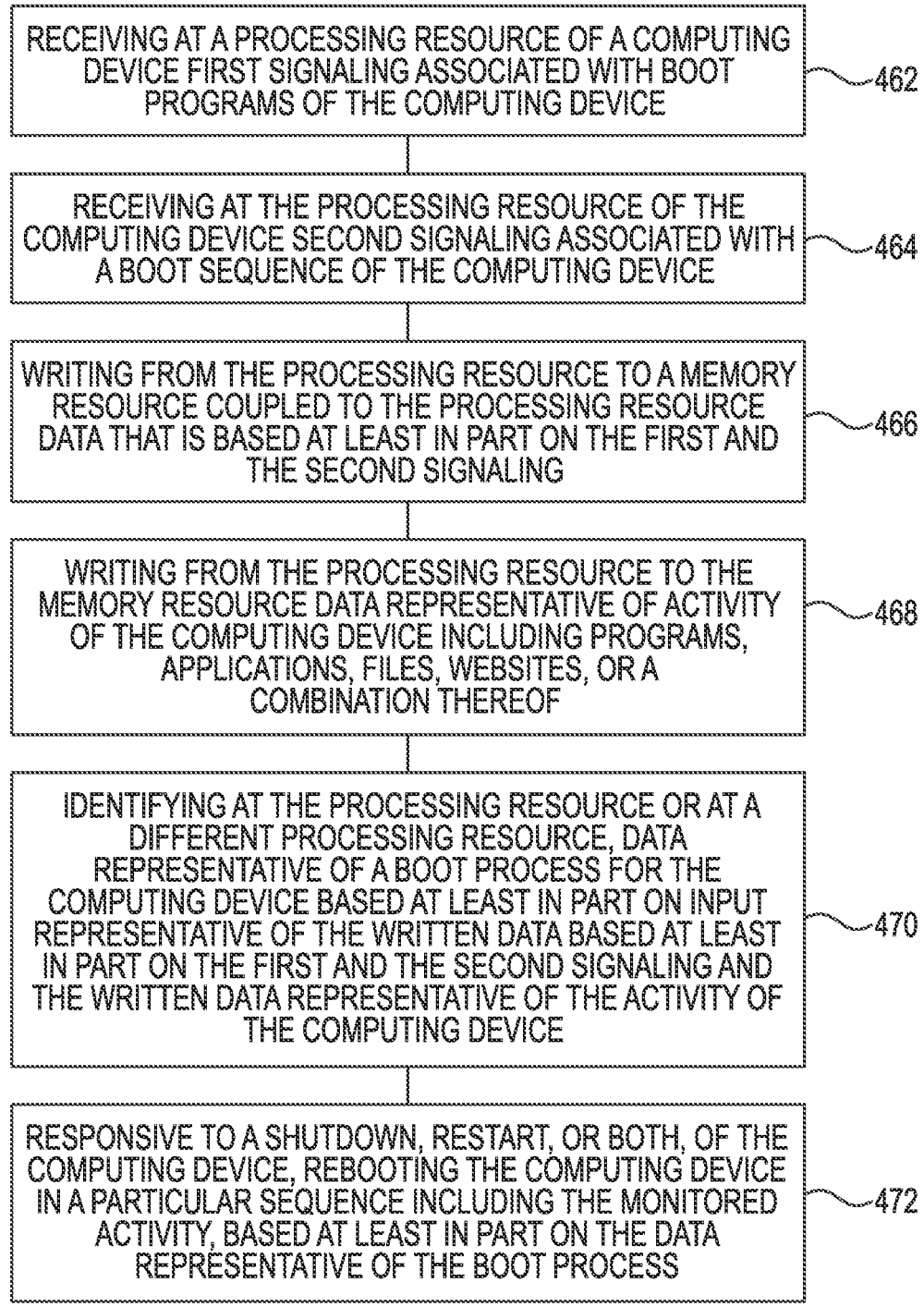
FIG. 4 is another flow diagram representing an example method for rebooting a computing device in accordance with a number of embodiments of the present disclosure.

FIG. 4 is another flow diagram representing an example method for rebooting a computing device in accordance with a number of embodiments of the present disclosure. The method can be performed by a system such as the systems 220 and 340 described with respect to FIGS. 2 and 3, respectively.

At 462, the method can include receiving at a processing resource of a computing device first signaling associated with boot programs of the computing device. Boot programs, for instance, can include programs, applications, etc. executing when booting a computing device and/or associated operating system. Put another way, a boot program can include a software program a user launches as part of a boot process (e.g., launching software programs, files, network connection, credential verification, etc.). For instance, a boot process can include booting a processing resource (e.g., a central processing unit), initializing hardware and firmware, and executing programs, applications, etc. At 464, the method can include receiving at the processing resource of the computing device second signaling associated with a boot sequence of the computing device. For instance, the boot process may occur in a particular order (e.g., initialize hard drive, initialize DVD drive, launch Program X, etc.). In some examples, receiving the second signaling can include recording a sequence of user actions taken to access the boot programs. For instance, a user may tend to launch Program A, then Program B, then Internet Browser C, then a work interface, and finally a work email account.

The method, at 466, can include writing from the processing resource to a memory resource coupled to the processing resource data that is based at least in part on the first and the second signaling. For instance, the boot process and an associated sequence can be written to a non-volatile memory resource such that data is not lost during a power outage, shutdown, restart, etc.

At 468, the method can include writing from the processing resource to the memory resource data representative of activity of the computing device including programs, applications, files, websites, or a combination thereof. The activity can include, for instance, open websites, in-use word processing documents, open file-sharing programs, or other in-use programs, applications, etc. For instance, the user may be composing a letter while referencing a document found on a particular website, and he or she may also be logged into a work file-sharing system. Data associated with these programs, applications, files, websites, etc. can be written to the memory resource.

In some examples, the data representative of the activity of the computing device is written to the memory resource responsive to receiving third signaling at the processing resource indicating an impending shutdown, restart, or both, of the computing device. For instance, when such signaling is received, the data may be automatically written and/or a user may manually write the data. In some examples, the activity can be determined at least in party by monitoring a task manager of the computing device, monitoring a task bar, pattern recognition of the task manager and/or task bar, or any combination thereof. The activity can be monitored periodically at predetermined time intervals, in some examples.

At 470, the method can include identifying at the processing resource or at a different processing resource, data representative of a boot process for the computing device based at least in part on input representative of the written data based at least in part on the first and the second signaling and the written data representative of the activity of the computing device. For instance, the boot process can include what programs, files, applications, etc. execute during the boot process and in what order. Additionally, the boot process may include the most recent activity written to the memory resource. For instance, in an example in which the identification includes the use of a machine learning model, the model can determine a boot process and associated boot process sequence, and the most recent activity (e.g., in-use applications, programs, websites, etc.) can be identified.

The method, at 472, can include rebooting the computing device in a particular sequence including the monitored activity, based at least in part on the data representative of the boot process responsive to a shutdown, restart, or both, of the computing device. Rebooting the computing device in the particular sequence can include executing programs, applications, files, websites, or a combination thereof that were running on the computing device prior to the shutdown, restart, or both, of the computing device. For instance, upon completion of reboot, the computing device mirrors a pre-reboot state (e.g., same programs, websites, applications, etc. open in the same state). Executing the programs, applications, files, websites, or combination thereof, for instance, can include prompting a user of the computing device for login and password information where required by the programs, applications, files, websites, or combination thereof. That is, a user can be prompted in the typical manner to provide identification to get back to the pre-reboot state.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   recording a boot process of a computing device and a boot program of the computing device, wherein the recording is performed at the processing resource, the memory resource, or both;
   identifying a particular sequence of the boot process based on input data representative of the boot process using a machine learning model that is updated each time the computing device is booted;
   creating a duplicate of the boot program;

responsive to a shutdown, restart, or both, of the computing device, rebooting the computing device in the particular sequence, wherein:
the rebooting comprises executing the duplicate; and
launching the duplicate comprises prompting a user of the computing device for login and password information where required by the duplicate.

2. The method of claim 1, further comprising writing boot program data and reboot sequence data from the processing resource to a memory resource.

3. The method of claim 1, further comprising monitoring activity of the computing device including the boot program periodically at predetermined time intervals.

4. The method of claim 2, further comprising writing from the processing resource to the memory resource data representative of activity of the computing device responsive to receiving signaling at the processing resource indicating an impending shutdown, restart, or both, of the computing device.

5. The method of claim 1, further comprising determining boot programs of the computing device at least in part by monitoring a task manager of the computing device.

6. The method of claim 1, further comprising recording a sequence of user actions taken to access the boot program.

7. The method of claim 1, further comprising creating duplicates of programs, applications, files, websites, or a combination thereof that were running on the computing device prior to the shutdown, restart, or both, of the computing device.

8. A non-transitory machine-readable medium comprising a processing resource in communication with a memory resource having instructions executable to:
identify at the processing resource or a different processing resource output data representative of a sequence of a boot process based at least in part on input data representative of the boot process and additional data stored in the memory resource and representative of previous boot processes of the computing device;
create a first duplicate of a boot program of the computing device; and
responsive to a shutdown, restart, or both, of the computing device:
reboot the computing device in the identified boot process sequence; and
execute the first duplicate, wherein the execution comprises at least the instructions executable to:
execute a process that was running on the computing device prior to the reboot, an application that was running on the computing device prior to the reboot, a program that was running on the computing device prior to reboot, a website open on the computing device prior to reboot, a file open on the computing device prior to reboot, or a combination thereof, wherein the execution comprises prompting a user of the computing device for login and password information where required by the application, the program, the website, the file, or combination thereof.

9. The medium of claim 8, further comprising the instructions executable to identify the output data representative of the sequence of the boot process using a machine learning model trained with data representative of the previous boot processes.

10. The medium of claim 8, further comprising the instructions executable to create a second duplicate of the program that was running on the computing device prior to reboot, the website open on the computing device prior to reboot, the file open on the computing device prior to reboot, or the combination thereof.

11. The medium of claim 10, wherein the instructions executable to execute the program that was running on the computing device prior to reboot, the website open on the computing device prior to reboot, the file open on the computing device prior to reboot, or the combination thereof, comprise instructions executable to execute the second duplicate.

12. The medium of claim 8, wherein the memory resource is a non-volatile memory resource.

13. The medium of claim 8, wherein the instructions are executable to record a sequence of user actions take to access the program that was running on the computing device prior to reboot, the website open on the computing device prior to reboot, the file open on the computing device prior to reboot, or the combination thereof.

14. The medium of claim 8, wherein the instructions are executable to determine the program that was running on the computing device prior to reboot, the website open on the computing device prior to reboot, the file open on the computing device prior to reboot, or the combination thereof at least in part using pattern recognition of a task manager of the computing device, a task bar of the computing device, or both.

15. A non-transitory machine-readable medium comprising a processing resource in communication with a memory resource having instructions executable to:
record, at the processing resource, the memory resource, or both, a boot process of a computing device and a boot program of the computing device;
write from the processing resource to the memory resource the recorded input data;
create a duplicate of the boot program;
write from the processing resource to the memory resource input data representative of the duplicate;
identify at the processing resource or a different processing resource output data representative of a sequence of the boot process based at least in part on input data representative of the boot process using a machine learning model that is updated each time the computing device is booted; and
responsive to a shutdown, restart, or both, of the computing device:
reboot the computing device in the identified boot process sequence; and
execute the duplicate.

16. The medium of claim 15, wherein the executed duplicate mirrors a pre-boot state of the computing device.

17. The medium of claim 15, further comprising the instructions executable to record the boot program responsive to receiving at the processing resource, the memory resource, or both, input data representative of a request to record the boot program before a manual reboot of the computing device.

18. The medium of claim 15, further comprising the instructions executable to:
determine latest versions of the boot program; and
create the duplicate using the latest versions.

* * * * *